(12) United States Patent
Stengrimsen

(10) Patent No.: US 7,981,344 B2
(45) Date of Patent: Jul. 19, 2011

(54) METHOD FOR MANUFACTURING A STORAGE CONTAINER FOR STORAGE OF NUCLEAR RADIATION MATERIAL

(75) Inventor: Frank Stengrimsen, Lørenskog (NO)

(73) Assignee: Nuclear Protection Products AS, Ilseng (NO)

( * ) Notice: Subject to any disclaimer, the term of this patent is extended or adjusted under 35 U.S.C. 154(b) by 0 days.

(21) Appl. No.: 12/428,644

(22) Filed: Apr. 23, 2009

(65) Prior Publication Data

US 2010/0230854 A1    Sep. 16, 2010

(30) Foreign Application Priority Data

Mar. 11, 2009    (NO) .................................... 20091080

(51) Int. Cl.
*B29C 45/14*    (2006.01)
*B29C 45/16*    (2006.01)

(52) U.S. Cl. ..................... 264/255; 264/297.3; 264/275; 264/297.8; 264/328.7

(58) Field of Classification Search .......................... None
See application file for complete search history.

(56) References Cited

U.S. PATENT DOCUMENTS

| 3,466,662 | A | | 9/1969 | Blum | |
|---|---|---|---|---|---|
| 3,482,284 | A | * | 12/1969 | Rees | 425/130 |
| 4,569,818 | A | | 2/1986 | Popp et al. | |
| 5,599,494 | A | * | 2/1997 | Marcus | 264/513 |
| 6,312,641 | B1 | * | 11/2001 | Hutchinson | 264/513 |
| 6,639,236 | B1 | * | 10/2003 | Low et al. | 250/506.1 |
| 7,150,845 | B1 | | 12/2006 | Gram | |
| 7,354,544 | B1 | * | 4/2008 | Stengrimsen | 264/250 |
| 2002/0014720 | A1 | * | 2/2002 | Sicilia et al. | 264/255 |
| 2008/0091164 | A1 | | 4/2008 | Fago et al. | |

FOREIGN PATENT DOCUMENTS

| JP | 1-114405 A | 5/1989 |
|---|---|---|
| WO | WO-01/57880 A1 | 8/2001 |
| WO | WO 2006/043826 A1 | 7/2006 |

OTHER PUBLICATIONS

Annex to Form PCT/ISA/206—Communication Relating to the Results of the Partial International Search dated Jun. 8, 2010 for International Application No. PCT/NO2010/000086.

* cited by examiner

*Primary Examiner* — Edmund H. Lee
(74) *Attorney, Agent, or Firm* — Birch, Stewart, Kolasch & Birch, LLP

(57) ABSTRACT

A method and a molding plant for manufacturing a storage container for storage of nuclear radiation material, the container having an inner container part of a first thermoplastic material, an intermediate container part of radiation inhibiting material on the outside of the inner container part, and an outer container part of a second thermoplastic material molded onto the outside of intermediate container part. First, second, third and fourth locations are present along a circular path. First, second and third sets of outer mould means are provided at said second, third and fourth locations, respectively, for enabling injection molding of said inner container part, said intermediate container part and said outer container part, respectively, thereat and at least one mould core or a plurality of mutually spaced mould cores being movable by means of a rotary turntable to successively move from the first location to the second location, then from the second location to the third location, then from the third location to the fourth location, and then from the fourth location back to the first location.

19 Claims, 11 Drawing Sheets

METHOD FOR MANUFACTURING A STORAGE CONTAINER FOR STORAGE OF NUCLEAR RADIATION MATERIAL

The present invention relates to a method and a plant for manufacturing a storage container for storage of nuclear radiation material, the container being of a type having an inner container part of a first thermoplastic material, an intermediate container part of nuclear radiation inhibiting material on the outside of the inner container part, and an outer container part of a second thermoplastic material moulded onto the outside of the intermediate container part.

It is previously known from U.S. Pat. No. 7,354,544; EP1812934=WO-06/043826; and WO-01/57880 methods and devices for manufacturing such a storage container for storage of nuclear radiation material.

The prior art solutions according to U.S. Pat. No. 7,354,544 and EP1812934=WO-06/043826 have the disadvantage that manufacturing is not possible as a continuous process, due to inter alia that the intermediate container part must be moulded quite separately and then be physically moved to and fitted onto the inner container part before the outer container part can be moulded by effectively in the moulding process so performed shrinking the outer container part onto the intermediate container part to yield a tight engaging fit. This is an overall cumbersome and rather difficult process to operate.

Other prior art, e.g. as disclosed in WO-01/57880, is based on pouring e.g. liquid lead or lead alloy into an inter-space between inner and outer container parts and allow it thereafter to solidify. This will however yield a high risk of cavities in the lead located in the inter-space and therefore the potential risk of yielding a defective storage container as regards prevention of nuclear radiation.

The present invention therefore aims at providing an efficient, yet reliable manufacturing method, as well as a plant for carrying out such a method.

According to the invention, the method comprises at least one array of the steps:
a) moving a mould core for the inner container part along a first sub-path from a first location to a second location,
b) placing at the second location a first set of outer mould means about the mould core to form a first space between the first set of outer mould means and the mould core,
c) injecting a first thermoplastic material into said first space and allowing it to solidify to provide the inner container part therefrom,
d) moving the first set of outer mould means away from the inner container part,
e) moving the mould core with the inner container part thereon along a second sub-path from the second location to a third location,
f) placing at the third location a second set of outer mould means about the inner container part to form a second space between the second set of outer mould means and the inner container part,
g) injecting a nuclear radiation inhibiting material into said second space and is allowing it to solidify to provide the intermediate container part therefrom,
h) moving the second set of outer mould means away from the intermediate container part,
i) moving the assembly of the mould core, the inner container part thereon and the intermediate container part moulded onto the inner container part along a third sub-path from the third location to a fourth location,
j) placing at the fourth location a third set of outer mould means about the intermediate container part to form a third space between the third set of outer mould means and the intermediate container part,
k) injecting a second thermoplastic material into said third space and allowing it to solidify to provide the outer container part therefrom,
l) moving the third set of outer mould means away from the outer container part,
m) moving the assembly of the mould core, the inner container part thereon, the intermediate container part moulded onto the inner container part, and the outer container part moulded onto the intermediate container part along a fourth sub-path from the fourth location to the first location, and
n) at the first location removing from the mould core the storage container comprising said inner container part, said intermediate container part moulded onto the inner container, and said outer container part moulded onto the intermediate container part.

In a preferred embodiment of the method, a further and second array of steps a)-n) is commenced when a first array of method steps a)-n) initiates its step e), i) or m).

It is also preferred, according to the invention, to add to the first and second arrays of method steps a)-n) a third array of method steps a)-n), the third array being commenced when the second array initiates its step e) and the first array initiates its step i) or m), or when the second array initiates its step i) and the first array initiates its step m).

Further, according to the invention, the method may comprise in addition to first, second and third arrays of method steps a)-n) a fourth array of method steps a)-n), the fourth array being commenced when the third array initiates its step e), the second array at that time initiates its step i), and the first array at that time initiates its step m).

Thus, these two, three or four arrays of method steps a)-n) will exhibit mutually time-spaced respective array procedure starts.

Said first, said second, said third and said fourth sub-paths preferably form together a circular path.

In order to obtain effective moulding steps, said inner container part, said intermediate container part and said outer container part are, respectively, moulded bottom up. Suitably, injection of moulding material is made at a top region of said first, said second and said third spaces, respectively.

Further, the method comprises the possibility of successively repeating the first, second and third arrays of steps a)-n).

Suitably, the first and second thermoplastic materials are of a same type of polyolefin material, e.g. High Density Polyethylene (HDPE). The nuclear radiation inhibiting material is suitably lead or a lead alloy, although other types of suitable nuclear radiation inhibiting materials are conceivable. However, such use of alternative materials could imply a necessity of thicker walls and bottom of the intermediate container part to meet required container specifications as regards preventing nuclear radiation from reaching the outside of the container.

The steps f), g) and h) provide for at least one circular ridge on the top face of the intermediate container part, configured to fit into at least one corresponding circular valley on a radiation inhibiting part of a lid when fitted onto the storage container. This will yield a kind of labyrinth sealing to prevent any risk of radiation leakage at an interface between the container and the lid.

The steps j), k) and l) provide for moulding on the outside of the outer container part threads for engagement with threads on a lid which is installable on the storage container.

In addition, the steps j), k) and l) may provide for moulding on the outside of the outer container part a grip bead means.

On the storage container, the top face of the inner container part is lower than the top face of the intermediate container part, the top face of the intermediate container part is lower than the top face of the outer container part.

Further, the mould core is at its base surrounded by a stepped base plate to accommodate for moulding the respective container parts to have said mutually different top faces on a completed storage container.

It will be appreciated that solidifying time at step k) in a preceding array of steps a)-n) determines a minimum solidifying time of subsequent at their steps g) and c), respectively.

According to the invention, the moulding plant for manufacturing a storage container for storage of nuclear radiation material, comprises:
- first, second, third and fourth locations present along a movement path subdivided into first, second, third and fourth sub-paths,
- at least one mould core or a plurality of mutually spaced mould cores being movable to and locatable successively at said first, second, third and fourth locations, and
- first, second and third sets of outer mould means for enabling injection moulding of said inner container part, said intermediate container part and said outer container part at said second, third and fourth locations, respectively.

In a preferred embodiment of the invention, said plurality of mutually spaced mould cores is two, three or four such cores to yield two, three or four of method steps a)-n), respectively, with mutually time-spaced respective array procedure starts.

Suitably, said first, said second, said third and said fourth sub-paths together form a circular path.

The plant has material injection means to provide for moulding material to be injected at a bottom region of said inner, intermediate and outer container part, respectively, upon moulding thereof in inverted position at said second, third and fourth locations, respectively.

The thermoplastic materials which are used are suitably, but not necessarily of a same type, e.g. of a polyolefin material such as a High Density Polyethylene (HDPE).

The injection means for the outer container could provide for injection of a thermoplastic material part having additives.

The injections means at the third location provide for nuclear radiation inhibiting material in the form of lead or a lead alloy, although the use of other types radiation inhibiting material would be possible, though yielding larger material thickness of the intermediate container part.

The moulding plant at the third location provides for at least one circular ridge on the top face of the intermediate container part, configured to fit at least one corresponding circular valley on a radiation inhibiting part of a lid when fitted onto the storage container. The interaction to be made between said at least one ridge and said at least one valley provides for a kind of labyrinth sealing to prevent radiation leakage at an interface between the container and the lid.

The outer mould means of the moulding plant at the third location provide for the top face of the inner container to be lower than the top face of the intermediate container part, and at the fourth location provide for the top face of the intermediate container part to be lower than the top face of the outer container part, and wherein the mould core at its base is surrounded by, integral with or attached to a stepped base plate to accommodate for moulding the respective container parts to have said mutually different top faces on a completed storage container.

The outer mould means at the fourth location are configured to mould on the outside of the outer container part threads adapted for engagement with threads on a lid which is installable on the storage container. Further, these outer mould means at the fourth location could be configured to mould on the outside of the outer container part grip bead means.

Further, the outer mould means at the second, third and fourth locations should be configured so that opposite faces of a pair of mold members allow for:
- the mould core to freely pass into the second location,
- the mould core and the inner container part thereon to freely pass out from the second location,
- the mould core and the inner container part thereon to freely pass into the third location,
- the mould core, the inner container part thereon and the intermediate container part on the inner container part to freely pass out from the third location,
- the mould core, the inner container part thereon and the intermediate container part on the inner container part to freely pass into the fourth location, and
- the mould core, the inner container part thereon, the intermediate container part on the inner container part, and the outer container part on the intermediate container part to freely pass out from the fourth location.

The invention is now to described in more detail with reference to attached schematic drawings referring to preferred, though not limiting examples of implementation of the present invention.

The expert in the art will appreciate, from the description and drawings provided that material hoppers, pulling and compression machinery, piping and hoses for hydraulics and pneumatics, as well as electric power for heating mould core and outer mould means etc. will be present in the moulding plant, although such remedies and means have not explicitly been shown for sake of clarity, and that means for driving the core(s) from one position-fixed location to the next and so on can be provided by using proper movement drive means, such as e.g. a turntable, to have said at least one core moved from the first location to the second location, then with the inner container part thereon to the third location, then with additionally the intermediate container part from the third location to the fourth location, and then additionally with the outer container part thereon finally back to the first location.

Figure 1:
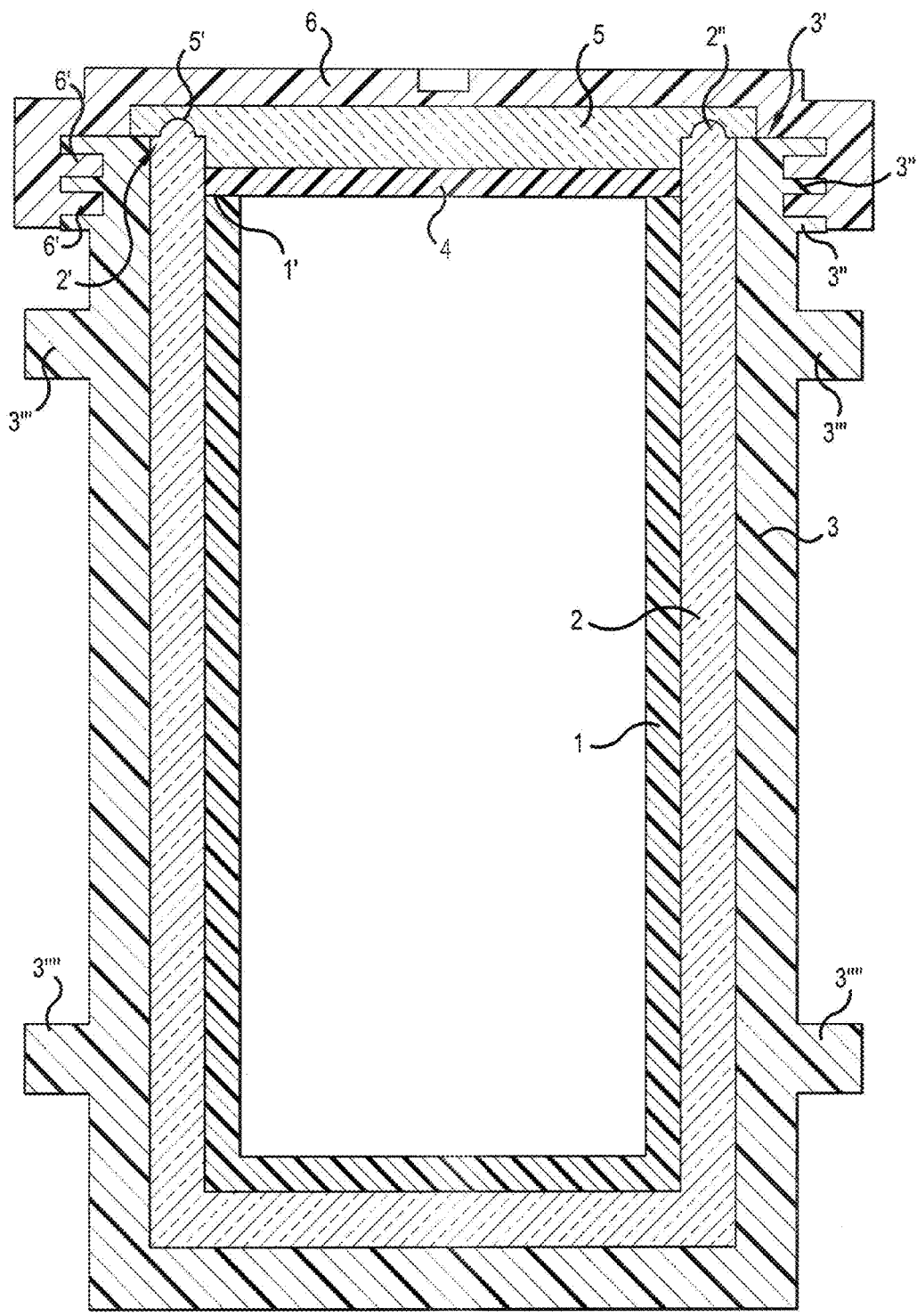
FIG. 1 illustrates schematically a storage container for storage of nuclear radiation material and with a lid fitted onto the container.

The storage container is schematically shown on FIG. 1. However, some minor structural details differ as regards configuration of the top of the intermediate container part and the outer container part compared with what is illustrated of FIGS. 4a, 4b, 5a and 5b. However, these differences are immaterial as regards the full appreciation of the concepts of the present invention.

As shown on FIG. 1, the container has an inner container part 1 of a first thermoplastic material, an intermediate container part 2 of nuclear radiation inhibiting material moulded onto the outside of the inner container part 1, and an outer container part 3 of a second thermoplastic material moulded onto the outside of the intermediate container part 2. As shown, the inner container part 1 has a top level 1' which is lower than the top level 2' of the intermediate container part 2. The intermediate container part 2 has its top level 2' either at a same, a higher or a lower level than the top level 3' of the outer container part 3. The outer container part 3 is provided with threads 3" to engage threads 6' on a lid when the lid is fitted onto the container. The lid has an inner lid part 4, suitably of the same type of thermoplastic material as the first thermoplastic material of the inner container part 1. The lid part 4 is attached to a radiation inhibiting lid part 5, suitably by means of adhesion, the material of the lid part 5 preferably being of the same type as the material of the inner container part. The lid part 5 is moulded to engage an outer lid part 6 made of a thermoplastic material, suitably of a same type as that of the outer container part 3.

Further, the container may on the outside of the outer container part 3 be provided with circumferential grip means 3'''; 3'''', e.g. shaped as protrusions. Such grip means may be suitable for interaction with e.g. a container handling robot in order not to cause damage to the thread section during handling operations of the container without or with a lid.

The manufacturing process will now be explained with reference to FIG. 2 and with additional reference to FIGS. 3-7.

Figure 2:
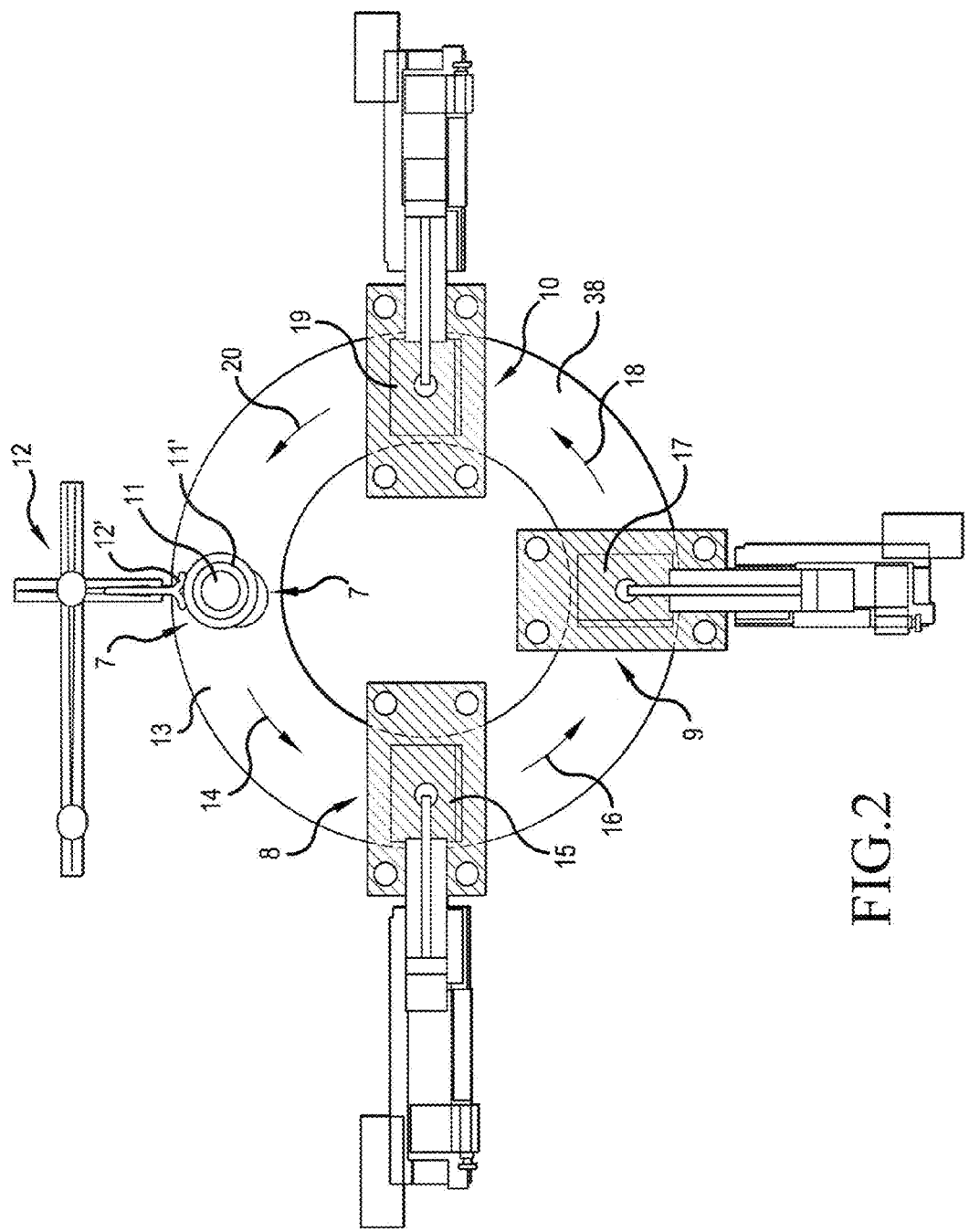
FIG. 2 illustrates schematically a manufacturing plant for making the storage container.

FIG. 2 shows four defined locations 7, 8, 9 and 10. The first location 7 is a start location for the a mould core 11 with a base 11', as well as a location for removal from a mould core 11 the completed storage container. Associated with the first location is an x, y, z robot 12 with grip means 12' for gripping a storage container from its mould core 11 and lift it therefrom and to move it to a place away from the moulding plant.

The mould core 11, 11' is on FIG. 2 shown as a single core currently at location 7. However, it should be obvious to the expert in the art that there could be two, three or four of such jointly movable cores, and in the context of FIG. 2 as shown then located at locations 10, 9 and 8, respectively in case of another three such cores.

As an outset, the method will be explained at first with reference to just one mould core 11.

The method comprises at least one array of the steps described as follows.

The mould core 11, 11' for the inner container part 1 is moved on a turntable 13 along a sub-path from the first location 7 to second location 8, then from the second location 8 to the third location 9, then from the third location 9 to the fourth location 10, and then from the fourth location 10 finally back to the first location 7.

The first movement of the mould core 11, 11' is along a first sub-path 14 from the first location 7 to the second location 8.

At the second location 8 a first set 15 of outer mould means 15', 15" is placed about the mould core 11,11' to form a first space between the first set 15 of outer mould means and the mould core 11, 11'. In this context, also see FIG. 3a.

Figure 3A:
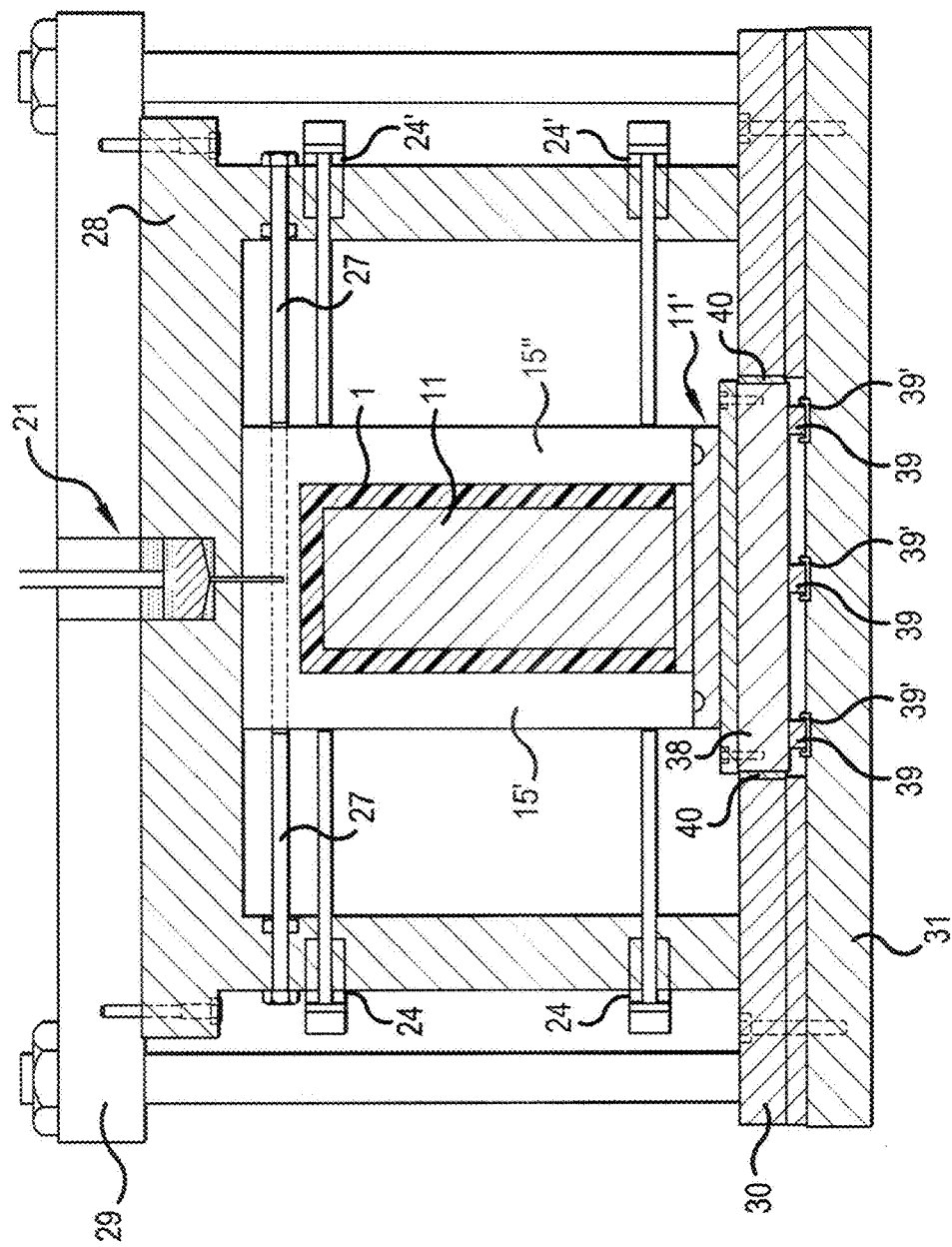
FIGS. 3a and 3b illustrate moulding operation states, moulding and release of outer moulding means, respectively, at a first moulding station a second location along a movement path.

A first thermoplastic material is then injected by injection means 21 into said first space and the material is allowed to solidify to provide the inner container part 1 therefrom, as seen from FIG. 3a.

Figure 3B:
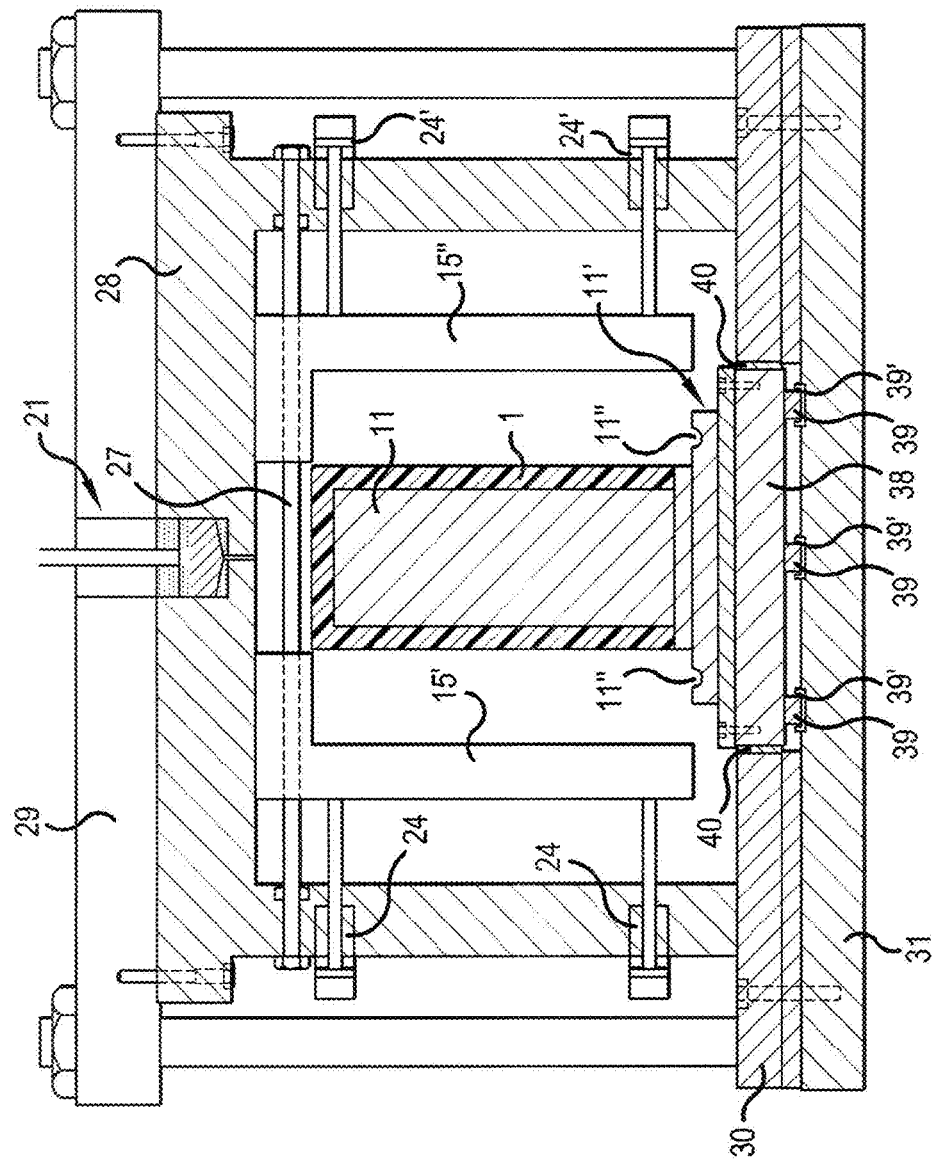

As indicated on FIG. 3b the first set of outer mould means 15', 15" is moved away from the moulded inner container part 1. The mould core 11,11' with the inner container part 1 thereon are then moved along a second sub-path 16 from the second location 8 to third location 9.

At the third location 9 a second set 17 of outer mould means 17', 17" (see FIG. 4a) is placed about the inner container part 1 to form a second space between the second set 17 of outer mould means and the inner container part 1.

Figure 4A:
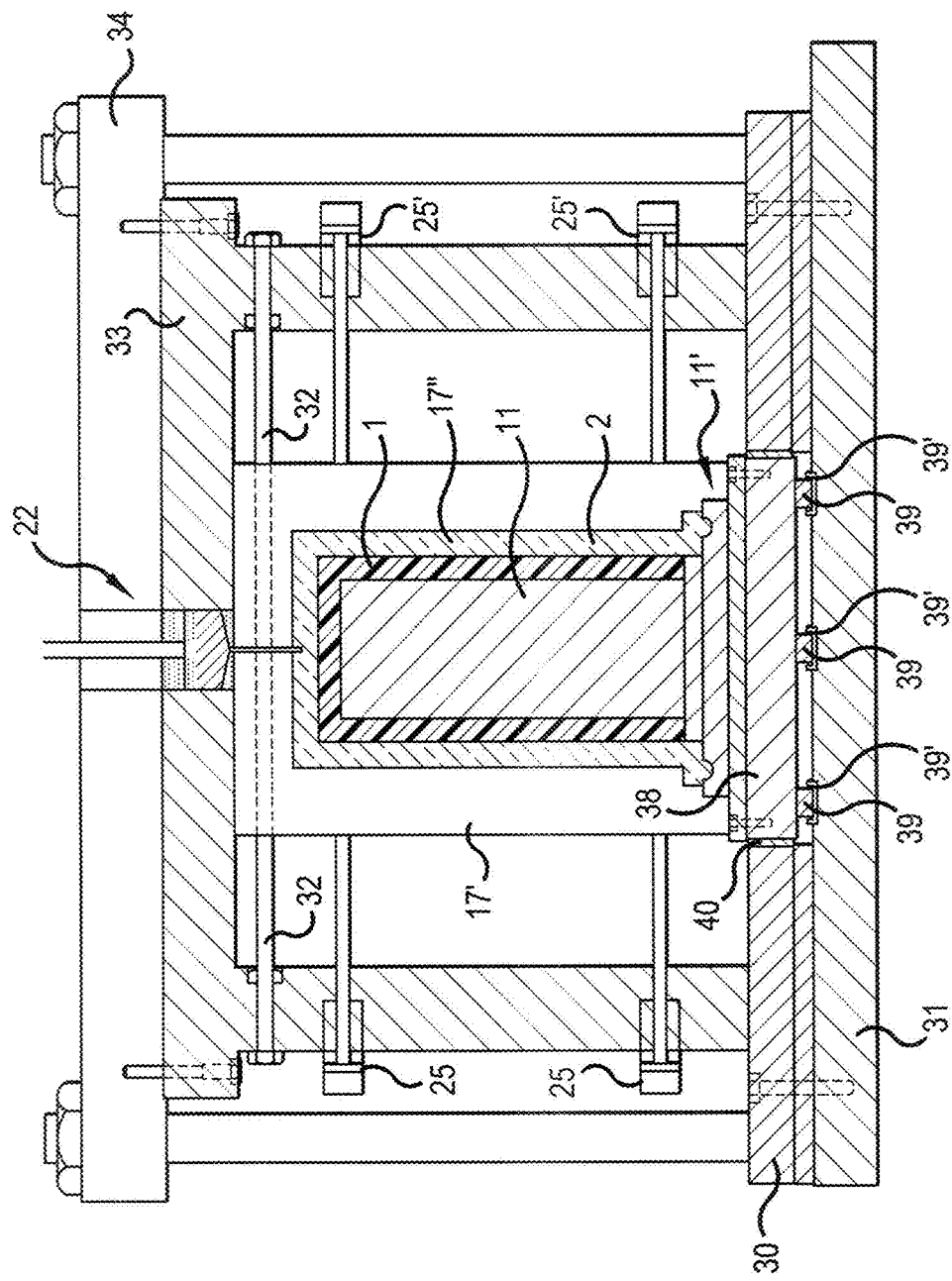
FIGS. 4a and 4b illustrate moulding operation states, moulding and release of outer moulding means, respectively, at a second moulding station a third location along a movement path.

As shown on FIG. 4a a nuclear radiation inhibiting material is injected by means of injection means 22 into said second space and allowed to solidify to provide the intermediate container part 2 therefrom.

Figure 4B:
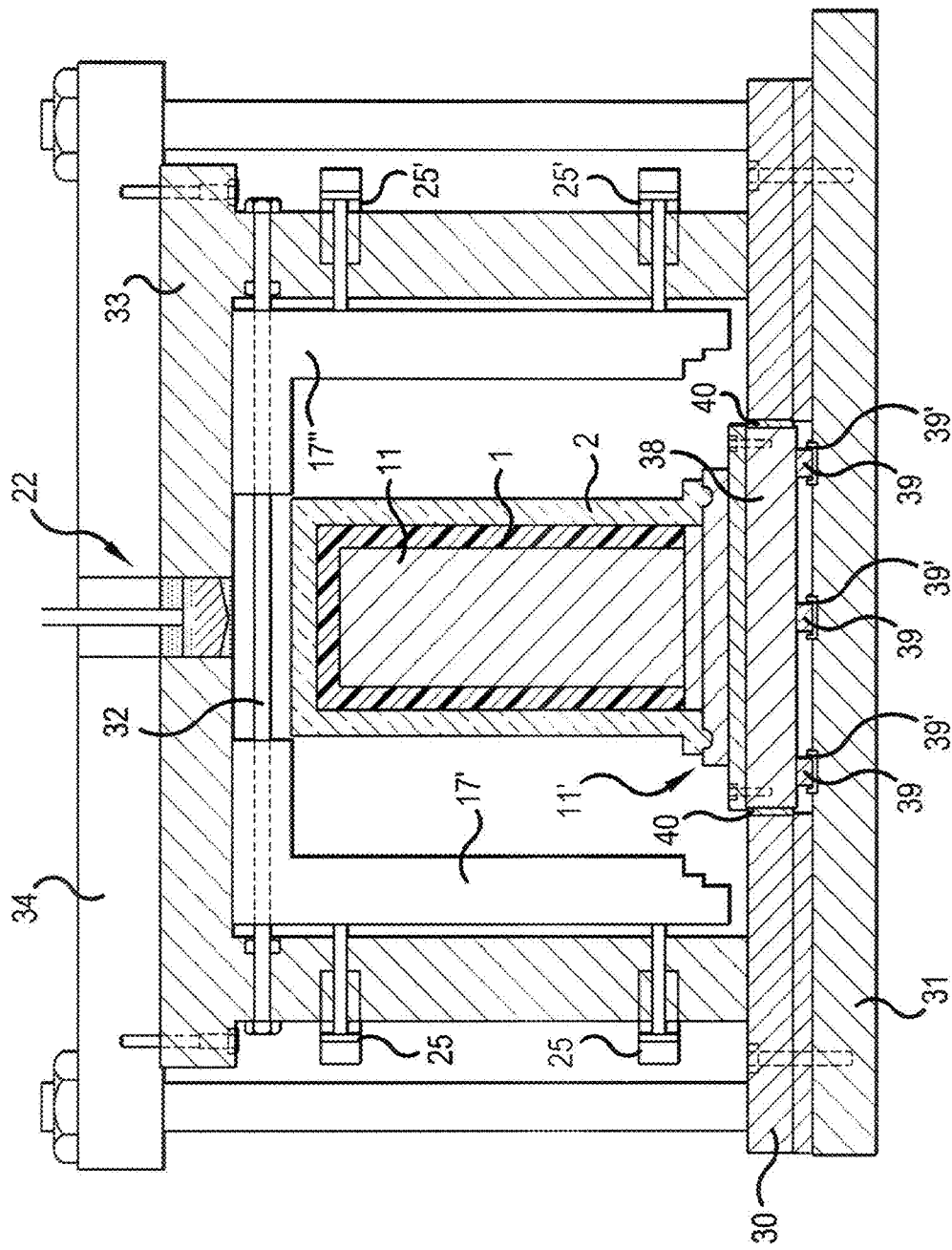

As indicated on FIG. 4b, thereafter the second set 17 of outer mould means is moved away from the intermediate container part 2, and the assembly of the mould core 11, 11', the inner container part 1 thereon and the intermediate container part 2 moulded onto the inner container 1 are then moved along a third sub-path 18 from the third location 9 to the fourth location 10.

Figure 5A:
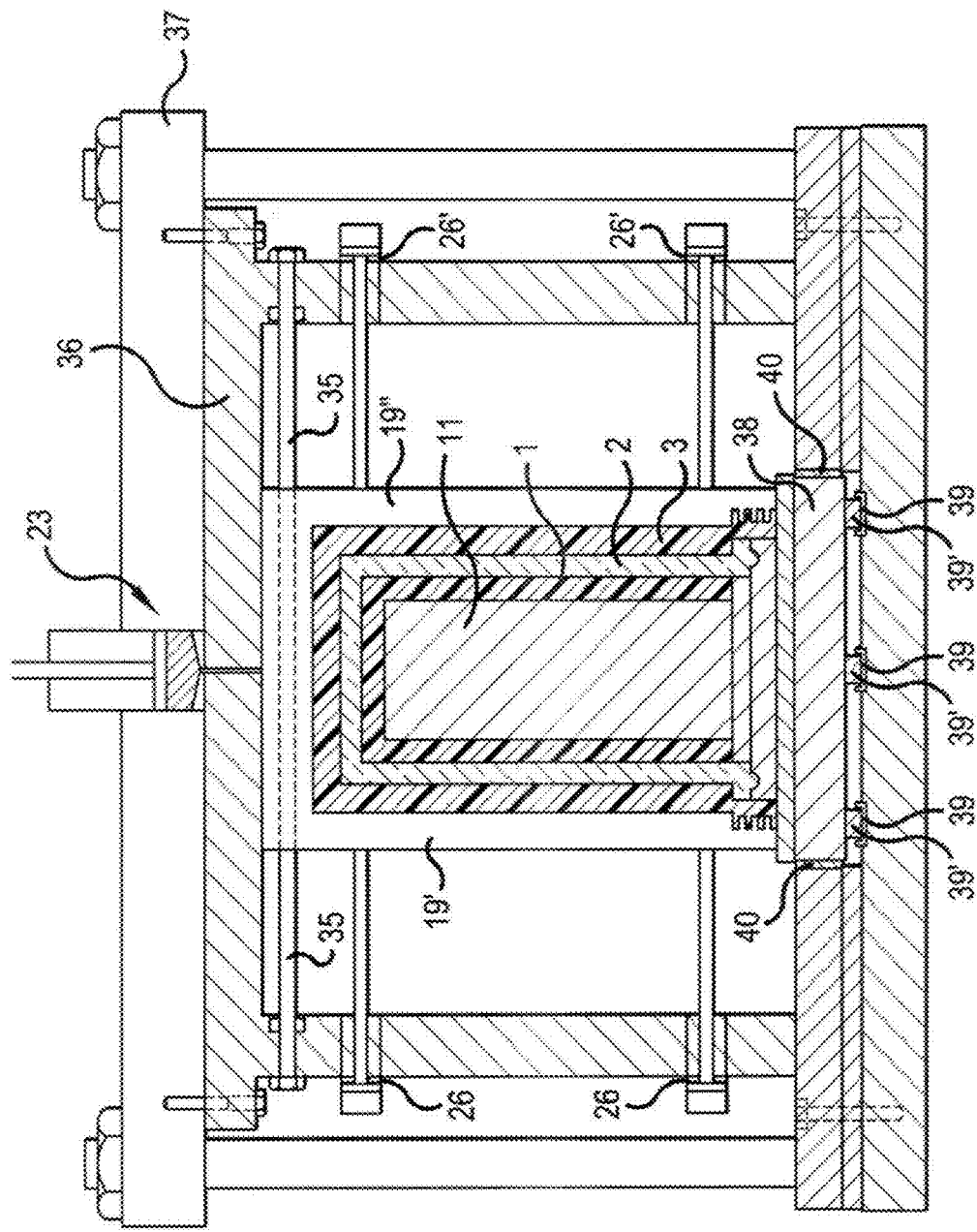
FIGS. 5a and 5b illustrate moulding operation states, moulding and release of outer moulding means, respectively, at a first moulding station a fourth location along a movement path.

As shown on FIG. 5a, at the fourth location 10 a third set 19 of outer mould means 19', 19" is placed about the intermediate container part 2 to form a third space between the third set 19 of outer mould means 19', 19" and the intermediate container part 2.

A second thermoplastic material is then injected by means of injection means 23 into said third space and allowed to solidify to provide the outer container part 3 therefrom.

Figure 5B:
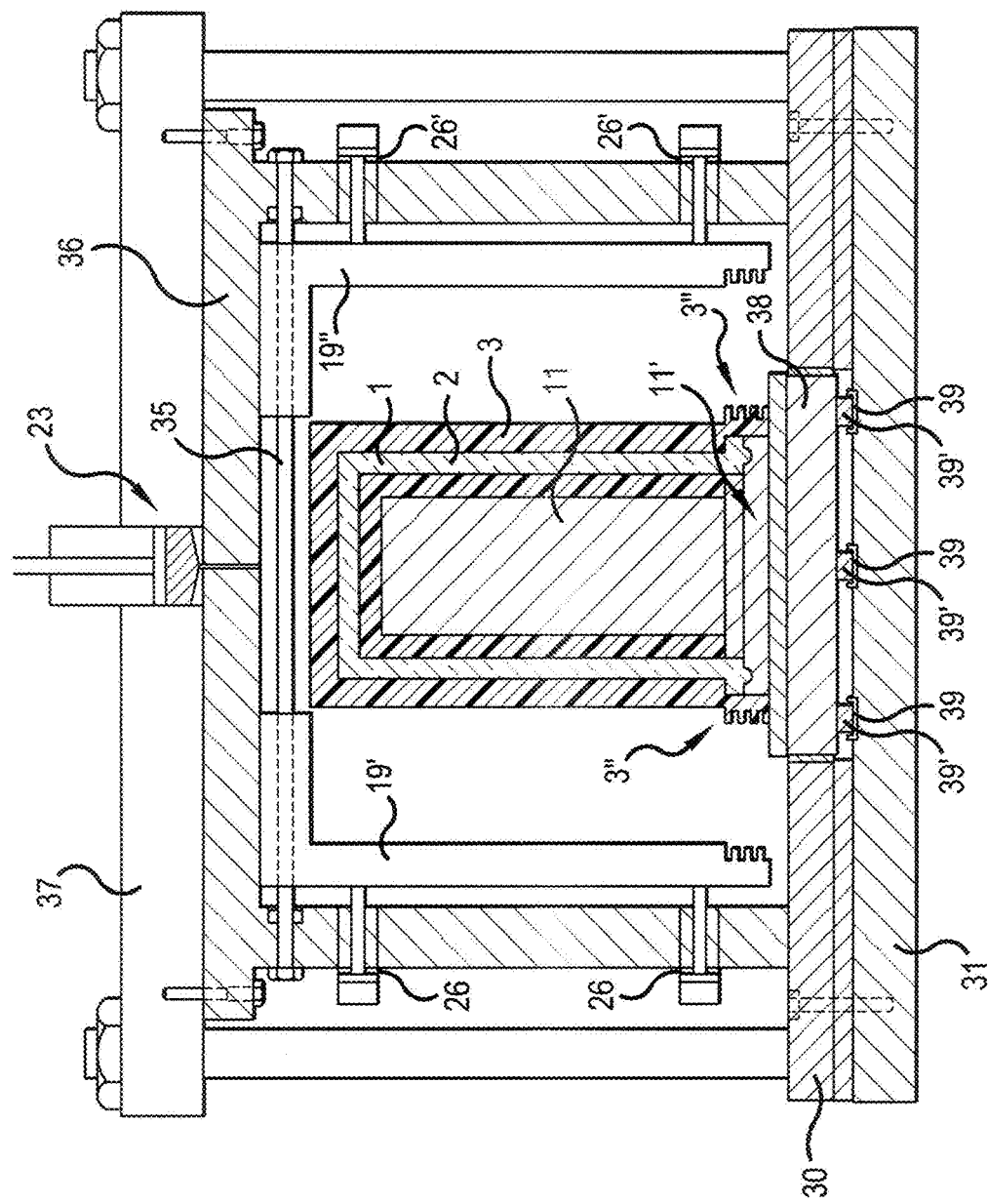

As shown on FIG. 5b, the third set 19 of outer mould means is then moved away from the outer container part 3, and the assembly of the mould core 11, 11', the inner container part 1 thereon, the intermediate container part 2 moulded onto the inner container part 1, and the outer container part 3 moulded onto the intermediate container part 2 are moved along a fourth sub-path 20 from the fourth location 10 to the first location 7.

At the first location 7 the robot 12, e.g. with suction pads 12' and or clamps to e.g. engage the grip means 3'''; 3'''', removes from the mould core 11, 11' the storage container comprising said inner container part 1, said intermediate container part 2 moulded onto the inner container 1, and said outer container part 3 moulded onto the intermediate container part 2.

In a preferred embodiment of the method, a further and second array of steps a)-n) is commenced when a first array of method steps a)-n) initiates its step e), i) or m). This requires the use of two movable mould cores 11, 11' which are mutually spaced by an integral number of sub-paths.

It is also preferred, according to the invention, to add to the first and second arrays of method steps a)-n) a third array of method steps a)-n), the third array being commenced when the second array initiates its step e) and the first array initiates its step i) or m), or when the second array initiates its step i) and the first array initiates its step m). This will require the use of three movable mould cores 11, 11' which are mutually spaced by an integral number of sub-paths.

Further, it is possible to visualize that in addition to first, second and third arrays of method steps a)-n) the method may also comprise a fourth array of method steps a)-n), the fourth array being commenced at location 7 when the third array initiates its step e), the second array initiates its step i), and the first array initiates its step m). This requires the use of four movable mould cores 11, 11' spaced one by one by a single sub-path.

Said first, said second, said third and said fourth sub-paths 14, 16, 18 and 20 preferably form together a circular path. It is however possible to visualize that an alternative manufacturing process could have a rectilinear path from the first to the fourth location, and that the completed storage container is returned in the opposite direction back to the first location for removal of the container from the mould core. Such a solution would enable use of a single core only.

In order to obtain effective moulding steps, said inner container part 1, said intermediate container part 2 and said outer container part 3 are, respectively, moulded bottom up. Suitably, injection of moulding material, irrespective of thermoplastic material or nuclear radiation inhibiting material, is made at a top region of said first, said second and said third spaces, respectively.

Further, the method comprises the possibility of successively repeating the first array of steps a)-n), or the first and second arrays of steps a)-n), or the first, second and third arrays of steps a)-n), or the first, second, third and fourth arrays of steps a)-n), related to the number arrays and the corresponding number of mould cores 11, 11' used.

Suitably, the first and second thermoplastic materials are of a same type of polyolefin material, e.g. High Density Polyethylene (HDPE). However, different types of thermoplastic material could be used as the first and second thermoplastic materials. The nuclear radiation inhibiting material is suitably lead or a lead alloy, although other types of suitable material are conceivable. However, such use of alternative material could imply necessity of thicker walls and bottom of the intermediate container part 2, due to inferior properties as regards inhibition of nuclear radiation, as mentioned earlier.

The steps f), g) and h) provide for at least one circular ridge 2" on the top face 2' of the intermediate container part, configured to fit into at least one corresponding circular valley 5' on the radiation inhibiting part 5 of the lid when fitted onto the storage container. Thus, a kind of labyrinth sealing is provided in order obtain proper inhibition of nuclear radiation at the interface between the container and the lid.

The steps j), k) and l) also provide for moulding on the outside of the outer container part 3 threads 3" for engagement with threads 6' on the lid which is installable on the storage container.

In addition, the steps j), k) and 1) provide for moulding on the outside of the outer container part 3 one or more of the grip means 3'", 3"" as schematically indicated on FIG. 1

On the storage container, the top face 1' of the inner container part 1 is lower than the top face 2' of the intermediate container part 2, and the top face 2' of the intermediate container part 2 is lower than, higher than or at same level as the top face 3' of the outer container part 3.

Further, the mould core 11 is at its base surrounded, attached to or integral with a stepped base plate 11' to accommodate for moulding of the respective container parts 1, 2, 3 to have said mutually positioned top faces on a completed storage container.

Figure 7:
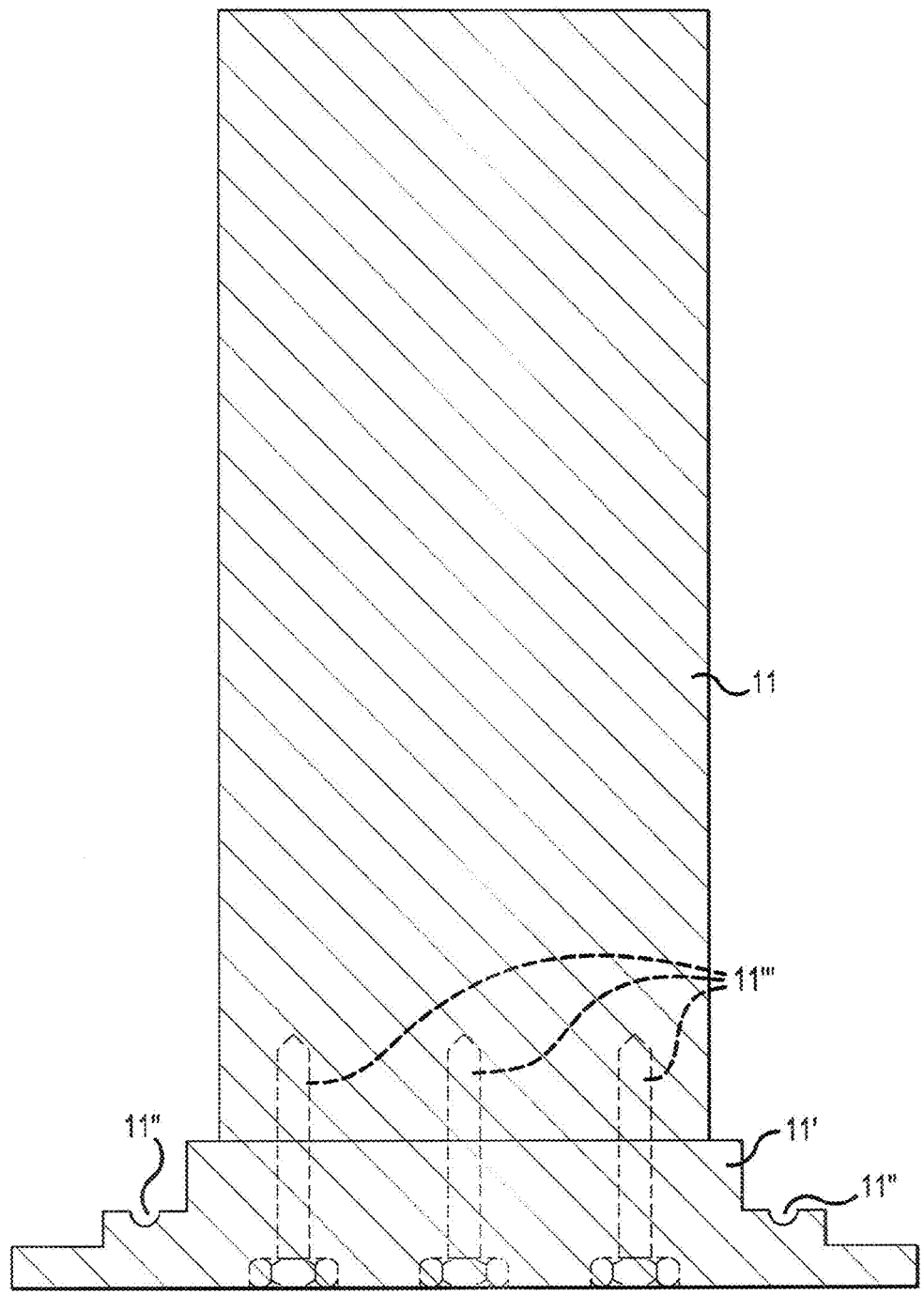
FIG. 7 shows as an example a mould core useful with the plant of the invention.

It is noted from FIG. 7 that the base plate may have valleys 11" to provide for said ridge 2" on the intermediate container part 2. The base plate 11' may suitably be attached to the mould core 11 by means of screws 11'", in order to provide for replacement of the base plate in case of modification of the configuration of the storage container.

It will be appreciated that solidifying time at step k) in a preceding array of steps a)-n) determines a minimum solidifying time of subsequent second and third arrays at their steps g) and c), respectively.

As indicated above, the moulding plant for manufacturing a storage container for storage of nuclear radiation material, comprises said first, second, third and fourth to locations 7-10 present along a path subdivided into said first, second, third and fourth sub-paths 14, 16, 18 and 20. Further, the plant comprises one mould core or a set of maximum four mutually spaced mould cores being movable to and locatable at successively said first, second, third and fourth locations, and then back to the start location, viz. the first location. The first, second and third sets of outer mould means 15, 17 and 19 enable injection moulding of said inner container part 1, said intermediate container part 2 and said outer container part 3 at said second, third and fourth locations 8, 9 and 10, respectively.

The moulding plant has said moulding material injection means 21-23 to provide for moulding material to be injected at a bottom region of said inner container part, intermediate container part and outer container part, respectively, upon moulding thereof in inverted position at said second, third and fourth locations, respectively, as more clearly seen on FIGS. 3a, 3b; 4a, 4b and 5a, 5b, respectively.

As mentioned earlier, the thermoplastic materials which are injected from the injection means 21 and 23 are suitably, but not necessarily of a same type of polyolefin material, e.g. a High Density Polyethylene (HDPE). The injection means 23 for the outer container 3 could provide for injection of a thermoplastic material part in the form of a reinforced polyolefin material.

The injections means 22 at the third location provide for nuclear radiation inhibiting material in the form of lead or a lead alloy, although the use of other types radiation inhibiting material would be possible, though yielding larger material thickness of the intermediate container part due to inferior radiation shielding properties than e.g. lead or lead alloy.

In order to move the outer mould means 15', 15"; 17', 17" and 19', 19" towards and away from each other, pneumatic or hydraulic rams 24, 24'; 25, 25' and 26, 26', respectively are provided. Multiple rams for each mould in a pair of such outer mould means could be provided, as indicated. However, a properly located and dimensioned single ram could be used for each mould in a pair.

Suitably, the outer mould means 15', 15" are slidable along a pair of slide rods 27 (only one rod in the pair is shown), and the rods 27 are suspended in a frame 28 which is attached a further frame 29, the frame 29 being attached to a base 30, and the base 30 being attached to a plant floor 31 common to all four locations 7-10.

Suitably, the outer mould means 17', 17" are slidable along a pair of slide rods 32 (only one rod in the pair is shown), and the rods 32 are suspended in a frame 33 which is attached a further frame 34, the frame 34 being attached to the base 30, and the base 30 being attached to the plant floor 31 common to all four locations 7-10.

Suitably, the outer mould means 19', 19" are slidable along a pair of slide rods 35 (only one rod in the pair is shown), and the rods 35 are suspended in a frame 36 which is attached a further frame 37, the frame 36 being attached to the base 30, and the base 30 being attached to the plant floor 31 common to all four locations 7-10.

From FIGS. 3a, 3b, 4a, 4b, 5a and 5b it is noted that the core base 11' is attached to a caroussel 38 which is movable on the plant floor 31 on rollers or wheels 39 along said sub-paths 14, 16, 18 and 20. The caroussel has suitably also side rollers 40 to stabilize the carousel through movement through the locations 7-10. The rollers or wheels 39 could suitably be rotatable along on rail tracks located in the plant floor. The caroussel could be of ring shaped configuration as shown e.g. on FIG. 2 or could be shaped as a set of rigidly interconnected wagons movable along a ring shaped path constituted by sub-paths 14, 16, 18 and 20, the wagons then having rollers or wheels 39 rotatable along rail tracks 39' to fully support the mould core 11, 11' and the container parts 1, 2 and 3 as they are successively moulded.

It will be appreciated that at each location 8, 9 and 10 where a moulding operation takes place, it is important as indicated earlier in section [030] above that the outer mould means at the second, third and fourth locations should be configured so that opposite faces of a pair of mold members allow for:

the mould core 11, 11' to freely pass into the second location 8, the mould core 11, 11' and the inner container part 1 thereon to freely pass out from the second location 8, the mould core 11, 11' and the inner container part 1 thereon to freely pass into the third location 9, the mould core 11, 11', the inner container part 1 thereon and the intermediate container part 2 on the inner container part 1 to freely pass out from the third location 9, the mould core 11, 11', the inner container part 1 thereon and the intermediate container part 2 on the inner container part to freely pass into the fourth location 10, and the mould core 11, 11', the inner container part 1 thereon, the intermediate container part 2 on the inner container part 1, and the outer container part 3 on the intermediate container part 2 to freely pass out from the fourth location 10.

This issue is due to the fact that the path formed by sub-paths 14, 16, 18 and 20 is circular, not rectilinear. The radius of curvature of the path is dependent on available overall space at the moulding plant and the radius of curvature could e.g. be larger or smaller than in the example shown of FIG. 6b. One way to solve the problem is to make the moulds of a pair of outer mould means, such as 19', 19 as shown on FIGS. 6a and 6b, move sufficiently apart, so that it would be provided enough space to avoid the newly moulded container part, e.g. part 3, to scratch edges of the mould on entering a new location (e.g. 10) and leaving such location (e.g. 10). However, such an approach would yield that the rams, e.g. 26, 26', would have to be larger than really required.

Figure 6A:
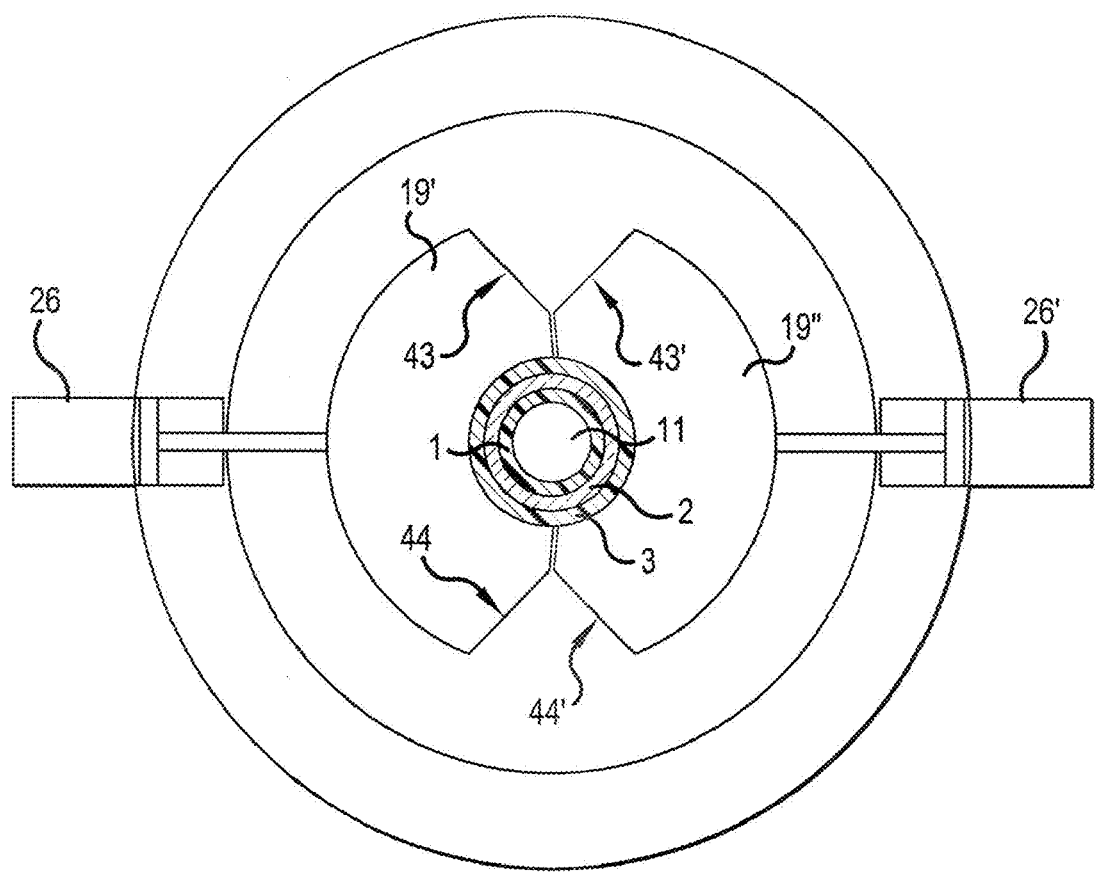
FIGS. 6a and 6b are a sectional view from above of the third moulding station with the outer mold means shown in closed position and opened position, respectively.
Figure 6B:
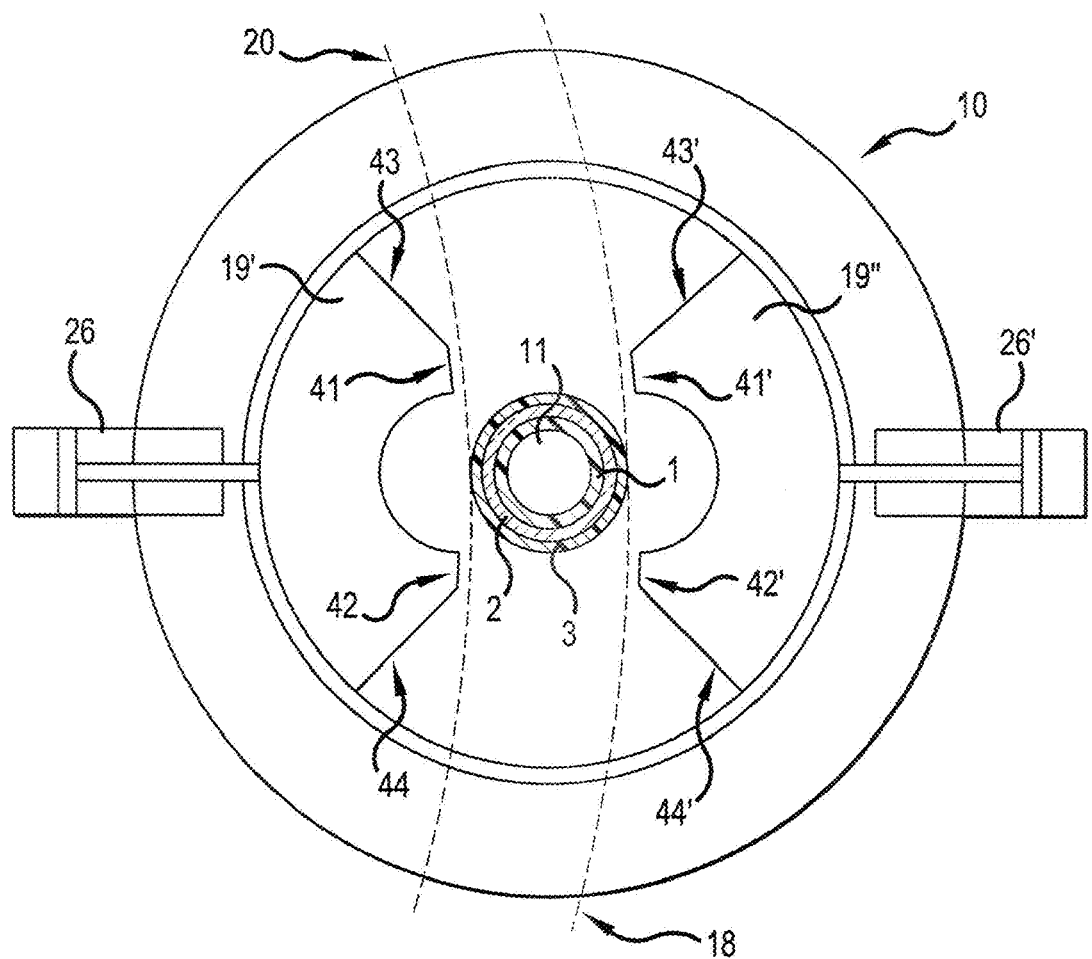

In order to avoid such a situation, it is proposed to let opposite faces of the moulds in a pair of outer mould means, such as e.g. moulds 19', 19" have slanted, complementary contact faces 41, 41' and 42, 42' adapted to the adjacent side curvature of the path, in FIG. 6b indicated by 18, 20. Further, both upstream and downstream of the respective location, faces of the moulds (e.g. 19', 19") should be facing away from each other so as to form at least an acute angle, e.g. in the range 10°-180°, as indicated by opposite portions 43, 43' and 44, 44' at upstream and downstream regions of the location in question, in FIG. 6 location 10.

As described, the present invention provides for an efficient manner to manufacture storage containers for storage of radioactive material, whereby a four-step process is provided by moulding the inner container part at the second, stationary location, moulding the intermediate container at the third, stationary location, moulding the outer container part at the fourth, stationary location and removing the manufactured storage container at the first, stationary location.

Thus, the mould core 11; 11' will be movable to the stationary second, third and fourth locations where the respective "female" outer moulding sets 15; 17 and 19 are located.

Although specific examples have been shown to illustrate the concepts of the invention, it will be appreciated by the skilled person in the art that the way the moulding locations have been illustrated is merely to visualize how the moulding operations can be performed, and that the actual configuration of the moulding locations would in practise be much more detailed and exhibit hydraulic drive machinery, pumps, hydraulic pipes and hoses, material hoppers, heating equipment, cooling equipment etc, all well known to the skilled person in the art. Although rigidly interconnected wagons are not shown in detail, such an embodiment would be readily appreciated by the skilled person in the art. Further, the thickness of the respective container parts as shown are not necessarily mutually to scale, nor are the width/length ratios. Such parameters will have to be customized dependent on type of nuclear material to be stored and its kind of radioactivity. The grip means 3'''; 3'''' as shown on FIG. 1 could have different configurations or could be deleted. Also, the threads 3'' could have more or less turns than shown on FIG. 1 or on FIG. 5b. The way the interface or cooperation between the container and the lid has been illustrated in FIG. 1 or could be derivable from FIG. 5b can be customized according to standards to be set.

Thus, modifications of the present invention are conceivable within the scope and spirit of the invention as described and shown on the drawings and presented in the attached claims.

The invention claimed is:

1. A method for manufacturing a storage container for storage of nuclear radiation material, the container having an inner container part of a first thermoplastic material, an intermediate container part of nuclear radiation inhibiting material on the outside of the inner container part, and an outer container part of a second thermoplastic material moulded onto the outside of intermediate container part, the method comprising at least one array of the steps:

a) moving a mould core for the inner container part along a first sub-path from a first location to a second location, said mould core being provided with its longitudinal axis in a vertical posture and with its base supported from below, b) placing at the second location a first set of outer mould means about the mould core to form a first space between the first set of outer mould means and the mould core, said first set comprising at least two mould parts, c) injecting a first thermoplastic material into said first space and allowing it to solidify to provide the inner container part therefrom, d) moving the first set of outer mould means away from the inner container part, e) moving the mould core with the inner container part thereon along a second sub-path from the second location to a third location, said mould core being still in a vertical posture and with its base still supported from below, f) placing at the third location a second set of outer mould means about the inner container part to form a second space between the second set of outer mould means and the inner container part, said second set comprising at least two mould parts, g) injecting a nuclear radiation inhibiting material into said second space and allowing it to solidify to provide the intermediate container part therefrom, h) moving the second set of outer mould means away from the intermediate container part, i) moving the assembly of the mould core, the inner container part thereon and the intermediate container part moulded onto the inner container part along a third sub-path from the third location to a fourth location, said mould core being still in a vertical posture and with its base still supported from below, j) placing at the fourth location a third set of outer mould means about the intermediate container part to form a third space between the third set of outer mould means and the intermediate container part, said mould core being still in a vertical posture, said third set comprising at least two mould parts, k) injecting a second thermoplastic material into said third space and allowing it to solidify to provide the outer container part therefrom, l) moving the third set of outer mould means away from the outer container part, m) moving the assembly of the mould core, the inner container part thereon, the intermediate container part moulded onto the inner container part, and the outer container part moulded onto the intermediate container part along a fourth sub-path from the fourth location to the first location, said mould core being still in a vertical posture and with its base still supported from below, and n) at the first location removing from the mould core the storage container comprising said inner container part, said intermediate container part moulded onto the inner container part, and said outer container part moulded onto the intermediate container part, said mould core being still in a vertical posture and with its base still supported from below, o) wherein said mould parts at said second, third and fourth locations are moved in a direction transverse to the longitudinal, vertical axis of the mould core, and p) wherein said mould core being with its longitudinal axis in a vertical posture throughout the movement from the first location in step a) and back to the first location in step n), the mould core at its base being attached to a carousel having rollers or wheels rotatable on a manufacturing plant floor or on rail tracks so as to be moved along a ring-shaped or circular path constituted by said first, second, third, and fourth sub-paths and to fully support the mould core and the container parts as they are successively moulded.

2. The method according to claim 1, comprising a further, second array of steps a)-n) which is commenced when a first array of method steps a)-n) initiates its step e), i) or m), and yielding the use of two mould cores.

3. The method according to claim 1, comprising in addition to first and second arrays of method steps a)-n) a third array of method steps a)-n), the third array being commenced when the second array initiates its step e) and the first array initiates its step i) or m), or when the second array initiates its step i) and the first array initiates its step m), and wherein three mould cores are used.

4. The method according to claim 1, comprising in addition to first, second and third arrays of method steps a)-n) a fourth array of method steps a)-n), the fourth array being commenced when the third array initiates its step e), the second array initiates its step i), and the first array initiates its step m), and wherein four mould cores are used.

5. The method according to claim 1, wherein said inner container part, said intermediate container part and said outer container part are, respectively, moulded bottom up.

6. The method according to claim 5, wherein injection of moulding material is made at a top region of said first, said second and said third spaces, respectively.

7. The method according to claim 1, comprising: successively repeating steps a)-n).

8. The method according to claim 2, comprising: successively repeating the first and second arrays of steps a)-n).

9. The method according to claim 3, comprising: successively repeating the first, second and third arrays of steps a)-n).

10. The method according to claim 4, comprising: successively repeating the first, second, third and fourth arrays of steps a)-n).

11. The method according to claim 1, wherein the first and second thermoplastic materials are of a same type of polyolefin material.

12. The method according to claim 11, wherein the polyolefin material is a High Density Polyethylene (HDPE).

13. The method according claim 1, wherein the nuclear radiation inhibiting material used for moulding the intermediate container part is lead or a lead alloy.

14. The method according to claim 1, wherein steps f), g) and h) provide for at least one circular ridge on the top face of the intermediate container part, configured to fit into at least one corresponding circular valley on a radiation inhibiting part of a lid when fitted onto the storage container.

15. The method according to claim 1, wherein the steps j), k) and l)provide for moulding on the outside of the outer container part threads for engagement with threads on a lid which is installable on the storage container.

16. The method according to claim 1, wherein the steps j), k) and l) provide for moulding on the outside of the outer container part at least one grip means.

17. The method according to claim 1, wherein on the storage container, the top face of the inner container part is lower than the top face of the intermediate container part, and wherein the top face of the intermediate container part is lower than, higher than or level with the top face of the outer container part.

18. The method according to claim 17, wherein the mould core at its base is surrounded by, attached to or integral with a stepped base plate to accommodate for moulding the respective container parts to yield said mutually positioned top faces on a completed storage container.

19. The method according to claim 1, wherein solidifying time at step k) in a preceding array of steps a)-n) determines a minimum solidifying time of subsequent arrays at their steps g) and c), respectively.

* * * * *